(12) United States Patent
Tian et al.

(10) Patent No.: US 11,297,855 B2
(45) Date of Patent: Apr. 12, 2022

(54) PREPARATION OF RECOMBINANT RICE WITH LOW GLYCEMIC INDEX WHOSE RAW MATERIAL IS SLOWLY DIGESTED STARCH

(71) Applicant: Jiangnan University, Wuxi (CN)

(72) Inventors: Yaoqi Tian, Wuxi (CN); Canxin Cai, Wuxi (CN); Jinling Zhan, Wuxi (CN); Zhengjun Xie, Wuxi (CN); Zhengyu Jin, Wuxi (CN); Lizhong Qiu, Wuxi (CN)

(73) Assignee: Jiangnan University, Wuxi (CN)

( * ) Notice: Subject to any disclaimer, the term of this patent is extended or adjusted under 35 U.S.C. 154(b) by 396 days.

(21) Appl. No.: 16/542,740

(22) Filed: Aug. 16, 2019

(65) Prior Publication Data

US 2020/0000131 A1 Jan. 2, 2020

Related U.S. Application Data

(63) Continuation of application No. PCT/CN2018/110728, filed on Oct. 18, 2018.

(30) Foreign Application Priority Data

Jul. 24, 2018 (CN) .......................... 201810820787.4

(51) Int. Cl.
*A23L 7/104* (2016.01)
*C08B 31/04* (2006.01)
*A23P 10/25* (2016.01)

(52) U.S. Cl.
CPC .............. *A23L 7/107* (2016.08); *A23P 10/25* (2016.08); *C08B 31/04* (2013.01); *A23V 2002/00* (2013.01)

(58) Field of Classification Search
None
See application file for complete search history.

(56) References Cited

U.S. PATENT DOCUMENTS

2004/0126476 A1* 7/2004 Kanemoto ................ B02B 1/00 426/615

FOREIGN PATENT DOCUMENTS

| CN | 103564306 A | 2/2014 |
| CN | 106234945 A | 12/2016 |
| CN | 107125559 A | 9/2017 |

OTHER PUBLICATIONS

CN104026461B Derwent Abstract Jun. 27, 2014 (Year: 2014).*
Gao CN108634295 Derwent Abstract Oct. 12, 2018 (Year: 2018).*
Wan (CN CN104277127A Jan. 14, 2015 Derwent Abstract (Year: 2015).*
Cai et al. Food Chemistry vol. 288 pp. 354-360 2019. (Year: 2019).*
Liu et al CN 104872523 Sep. 2, 2015 (Year: 2015).*
Carbohydrates and Blood Sugar https://web.archive.org/web/20170130010758/https://www.hsph.harvard.edu/nutritionsource/carbohydrates/carbohydrates-and-blood-sugar/. (Year: 2017).*

* cited by examiner

*Primary Examiner* — Felicia C Turner
(74) *Attorney, Agent, or Firm* — IPro, PLLC

(57) ABSTRACT

The present disclosure discloses a preparation method of low-glycemic index slowly digestible starch-based reconstituted instant rice, and belongs to the technical field of food processing. The preparation method is based on high-temperature fluidization technology to carry out non-crystallization treatment on a solid phase broken rice raw material in a short period of time, and then the material is subjected to a one-step reactive extrusion technology combining enzymatic hydrolysis and esterification treatment to prepare the reconstituted instant rice with high content of slowly digestible starch and low glycemic index. The reconstituted instant rice prepared by the one-step molding extrusion technology is suitable for type II diabetes patients to eat, and at the same time increases the added value of agricultural and sideline products, reduces production cost, and improves production efficiency.

7 Claims, No Drawings

PREPARATION OF RECOMBINANT RICE WITH LOW GLYCEMIC INDEX WHOSE RAW MATERIAL IS SLOWLY DIGESTED STARCH

TECHNICAL FIELD

The present disclosure relates to a preparation method of low-glycemic index slowly digestible starch-based reconstituted instant rice, relates to reconstituted instant rice produced by esterification combined with an enzyme-adding extrusion technique, belongs to the technical field of food processing, and particularly relates to grain food and a method.

BACKGROUND

In the past decade, the number of people with diabetes worldwide has grown rapidly at an alarming rate. According to statistics in 2010, the total population of diabetic patients in China has reached 116 million, accounting for 11.6% of the total population. As can be seen, China has become the country with the largest diabetic population in the world. Prevention and treatment of diabetic patients have also become one of the major public health problems.

Postprandial hyperglycemia is a major cause of diabetes exacerbation and complications, so control over postprandial blood glucose is an effective measure to prevent diabetes. The diet of diabetic patients, especially the selection and control of staple foods (i.e., carbohydrates), is the basis of diabetes treatment, and has certain connection long-term control of blood glucose in diabetic patients and the occurrence and development of chronic complications. Therefore, the selection of low-glycemic index staple food is the focus of diabetic diet treatment.

Starch is the most important source of carbohydrates and the main source of energy for human beings, playing an irreplaceable role in people's daily lives. Many studies have shown that slowly digestible starch has a low glycemic index (GI), and plays an important role in control of postprandial blood glucose and insulin levels, improvement of insulin resistance, reduction of pressure of the blood glucose homeostasis control system, and prevention and treatment of various diet-related chronic diseases. Nowadays, the main preparation methods of the slowly digestible starch are physical methods, chemical modification methods, biological enzymatic methods and combination of various methods. However, the existing methods still have defects such as complicated preparation methods, poor product effects, and generation of few harmful substances in the preparation process. Therefore, there is an urgent need to develop a novel method for preparing a low-glycemic index staple food product which is low in cost, easy for large-scale industrial production, and capable of overcoming the processing instability of slowly digestible starch products.

Extrusion technology is a high-temperature, short-time process suitable for a wide range of materials. In addition, the extrusion method has the advantages of low production cost, high production efficiency and high energy utilization rate, and reconstituted extruded rice can be prepared by "integral molding" by granulation technology. The production process is dry treatment, does not produce wastewater, and has the advantages of short reaction time, high production efficiency, environmental protection, etc. However, the traditional extrusion process will result in a decrease in the slowly digestible starch content by 45% or higher of the total slowly digestible starch content, and an increase in glycemic index by 35% or higher of the original glycemic index (the slowly digestible starch content in the product is generally around 20-40%, and the glycemic index is in a medium glycemic index range, around 60-80). Further improvement is needed to prepare reconstituted instant rice with a high slowly digestible starch content and a low glycemic index suitable for diabetics to eat.

SUMMARY

The present disclosure provides a preparation method of low-glycemic index slowly digestible starch-based reconstituted instant rice, which uses rice flour subjected to solid-state non-crystallization treatment as a raw material, and combines protease hydrolysis, acetic anhydride esterification, and one-step reactive extrusion molding technologies to prepare the reconstituted instant rice product with high content of slowly digestible starch and low glycemic index.

The present disclosure is listed as below: raw material broken rice flour is subjected to solid-state non-crystallization treatment to break the micelle state of starch molecules in the broken rice flour, the crystal structure of starch is destroyed, amylopectin is de-clustered in a short time, and the steric effect between starch molecules is reduced; and by matching a reactive one-step extrusion molding technology combining acetic anhydride esterification and protease enzymatic hydrolysis, protein in the rice flour is separated from starch by enzymatic hydrolysis, and combined with the heat energy, high mechanical force, high shear force, esterification and the like in an extrusion process, high-content slowly digestible starch is formed to obtain the low-glycemic index reconstituted instant rice.

Specifically, the method of the present disclosure includes the following steps:

(1) Humidification of broken rice: broken rice is humidified by a spraying process.

(2) Solid-state non-crystallization pretreatment: the broken rice is subjected to non-crystallization pretreatment by an instantaneous high-temperature fluidization technology, so that the gelatinization degree of the material reaches 65%-85%.

(3) Pulverization and mixing: the broken rice treated in step (2) is pulverized into 80-100 mesh rice flour, protease is added, and the mixture is uniformly mixed; the total addition amount of the protease (3.5 U/mg in specific enzyme activity) is 1%-3% (w/w) of the rice flour raw material, the moisture content is adjusted to 30%-50%, and the pH is adjusted to 8.5-9.5.

(4) Esterification reaction combined with enzyme addition, extrusion, compounding and molding: the mixture obtained in step (3) is fed into a twin-screw extruder, and the solid feed rate is 2-5 kg/h before the start of extrusion; the temperatures of four stages of the twin-screw extruder are set to 55-65° C., 65-75° C., 75-85° C. and 85-110° C. respectively, the screw speed is 70-110 rpm, the die pore diameter of the extruder discharge port is 4-8 mm, and the cutter speed at the discharge port is 200-250 rpm; anhydrous acetic anhydride of which the addition amount is 3-6% (w/w) of the rice flour raw material is added to the second stage temperature change process (65-75° C.) of a screw, and is added to the extruded material at a constant rate of 0.5-2 mL/min; extrusion granulation is carried out by the twin-screw extruder, and cutting is carried out at the die to obtain granular or spherical or rod-shaped particles 4-6 mm long in particle size.

(5) Drying and packaging: the rice granule product prepared in step (4) is dried by a hot air fluidized bed, wherein the drying temperature is 100-130° C., the drying time is 10-15 min, and the moisture content after drying is controlled to be 6%-10%; after drying, the rice is cooled and packaged to obtain the low-glycemic index instant rice.

In an embodiment of the present disclosure, the humidification method in step (1) is a spraying process, the selected spray temperature is 25-30° C., then the raw material is taken out and spread, surface moisture of the raw material is dried by the cold air for later use, and the dry-basis water content of the raw material after treatment is 30-40%.

In an embodiment of the present disclosure, the broken rice in step (1) is produced during rice processing and does not meet the requirements of polished rice grains, thereby realizing full use of additional value of agricultural products.

In an embodiment of the present disclosure, the high-temperature fluidization treatment in step (2) is to deliver the broken rice flour after the humidification treatment into a high-temperature fluidizing machine, the fluidization temperature is 220-250° C., and the fluidization time is 30-50 s. After the treatment, the material is discharged from the discharge port, so that the gelatinization degree of the material reaches 65%-85%. The gelatinization degree is determined by an amylase method. The gelatinized starch and the original starch are selectively decomposed by glucoamylase, and reducing sugar content is determined by a DNS method to obtain the gelatinization degree. Starch gelatinization degree refers to the gelatinization degree achieved by the starch during processing, that is, the ratio of gelatinized starch to the total starch content of a sample. Gelatinization (maturation) degree (%)=(determined sample absorbance−blank absorbance)/(full gelatinization sample absorbance−blank sample absorbance)×100(%).

In an embodiment of the present disclosure, the protease in step (3) is alkaline protease.

In an embodiment of the present disclosure, the enzyme activity of the alkaline protease is 2-5 U/g.

1 U refers to the amount of alkaline protease capable of hydrolyzing casein to produce 1 μg of tyrosine per minute at a pH of 8-10 and a temperature of 37° C.

Beneficial Effects (1) The low-glycemic index reconstituted instant rice disclosed by the present disclosure adopts broken rice as a raw material, has wide source, is beneficial to the increase of the added value of agricultural and sideline products and has high added value of science and technology.

(2) The low-glycemic index reconstituted instant rice disclosed by the present disclosure adopts solid-state noncrystallization treatment of raw broken rice flour, and matches a reactive one-step extrusion molding technology combining acetic anhydride esterification and protease enzymatic hydrolysis to prepare the reconstituted instant rice product with high content of slowly digestible starch, good heat resistance and low glycemic index, wherein the slowly digestible starch accounts for 50%-70% or higher of the total starch content of the product, and after the slowly digestible starch is brewed for 5-10 minutes with boiling water, the residual amount of the slowly digestible starch reaches 70%-80% or higher; the glycemic index of the product is 50-55 or lower.

(3) The low-glycemic index reconstituted instant rice obtained by the production process of the present disclosure has low production cost, is easy to produce continuously and has short production cycle and high production efficiency, and the production process reduces industrial wastewater discharge.

(4) The reconstituted instant rice prepared by the present disclosure has a low glycemic index and is suitable for being taken by patients with type II diabetes through control over blood sugar. The reconstituted instant rice is easy to use and can be eaten after brewed for 5-10 minutes with boiling water.

DETAILED DESCRIPTION

The alkaline protease in the following examples is purchased from Sigma-Aldrich.

Determination of Slowly Digestible Starch Content:

The slowly digestible starch content is determined by an Englyst method. 200 mg of a sample is weighed and put into a 50 mL centrifuge tube, 2 mL of water is added, and the mixture is uniformly mixed and then oscillated in a 37° C. constant temperature water bath (at a rotation speed of 160 rpm). 4 mL of a pepsin solution (containing 0.5 g of pepsin, 0.5 g of guar gum dispersed in 100 mL of a 5 mol/L hydrochloric acid solution) is added for reaction for 30 min. After that, 5 glass beads and 2 mL of a 0.5 mol/L sodium acetate solution (pH=5.2) are added to each test centrifuge tube to continue oscillating for 30 min. Then 2 mL of a mixed enzyme solution (containing 8 g of pancreatin and 1.96 mL of glucoamylase (260 U/mL) dispersed in 44.8 mL of water) is added for hydrolyzing for 0 min and 20 min, then 0.1 mL of the sample is taken and 0.9 mL of 90% ethanol is added for inactivating the enzyme. After centrifugation at 10,000 g for 5 min, the supernatant is taken, and water without the sample is used as a blank sample. The glucose content is determined using a glucose oxidase kit (GOD-POD), and each sample is measured for three times in parallel and the average thereof is taken. Slowly digestible starch (SDS) is starch that is not digested and absorbed by the small intestine within 20 minutes. The specific formula is as follows:

$$SDS=(G_{20}-G_0)\times 0.9\times 100\%/TS;$$

where $G_0$ and $G_{20}$ are glucose/mg released after enzymatic hydrolysis for 0 min and 20 min respectively, and TS is the total starch dry-basis weight/mg of the sample.

Determination of In Vitro Simulated Postprandial Glycemic Index:

The in vitro simulated postprandial glycemic index is determined by a Goni method. 200 mg of a sample is weighed and put into a 50 mL centrifuge tube, 2 mL of water is added, and the mixture is uniformly mixed and then oscillated in a 37° C. constant temperature water bath (at a rotation speed of 160 rpm). 4 mL of a pepsin solution (containing 0.5 g of pepsin, 0.5 g of guar gum dispersed in 100 mL of a 5 mol/L hydrochloric acid solution) is added for reaction for 30 min. After that, 5 glass beads and 2 mL of a 0.5 mol/L sodium acetate solution (pH=5.2) are added to each test centrifuge tube to continue oscillating for 30 min. Then 2 mL of a mixed enzyme solution (containing 8 g of pancreatin and 1.96 mL of glucoamylase (260 U/mL) dispersed in 44.8 mL of water) is added, and accurate timing is carried out. After oscillating and hydrolyzing for 0, 30, 60, 90, 120 and 180 min, 0.1 mL of the sample is taken and 0.9 mL of 90% ethanol is added for deactivating the enzyme. After centrifugation at 10,000 g for 5 min, the supernatant is taken, and water without the sample is used as a blank sample. The glucose content is determined using a glucose oxidase kit (GOD-POD), and each sample is measured for three times in parallel and the average thereof is taken. The digestion rate of the sample is identified by the hydrolysis rate (%) of the sample in 0-180 min, and the area under a curve (AUC) of hydrolysis is charted and calculated. The formulas for calculating the hydrolysis index (HI) and the glycemic index of the sample are as follows:

$$HI = \frac{AUC(\text{sample})}{AUC(\text{reference})} \times 100\%;$$

$$GI = 0.549 \times HI + 37.91.$$

Example 1

(1) Broken rice is humidified by a spraying process. The spray temperature is 25° C. After being sprayed, the raw material is taken out and spread, and surface moisture of the raw material is dried by cold air for later use. The dry-basis moisture content of the raw material after treatment is 30-40%.

(2) The broken rice is subjected to non-crystallization pretreatment by an instantaneous high-temperature fluidization technology. The broken rice after the humidification treatment is delivered into a high-temperature fluidizing machine, the fluidization temperature is 220° C., and the fluidization time is 30 s. After the treatment, the material is discharged from a discharge port, so that the gelatinization degree of the material reaches 65%.

(3) The treated broken rice is pulverized into 80 mesh rice flour, simultaneously protease is added, and the mixture is uniformly mixed. The enzyme preparation added in extrusion is alkaline protease, the total addition amount of the protease is 1% (w/w) of the rice flour raw material, the pH is adjusted to 8.5, and the moisture content is adjusted to 30%.

(4) After mixing, the mixture is fed into a twin-screw extruder, and the solid feed rate is 2 kg/h before the start of extrusion. The temperatures of four stages of the twin-screw extruder are set to 55° C., 65° C., 75° C. and 85° C. respectively, the screw speed is 70 rpm, the die pore diameter of the extruder discharge port is 4 mm, and the cutter speed at the discharge port is 200 rpm. Anhydrous acetic anhydride is added to the middle part of the second temperature change stage of a screw, and is added to the extruded material at a constant rate of 0.5 mL/min. Extrusion granulation is carried out by the twin-screw extruder, and cutting is carried out at the die to obtain granular or spherical or rod-shaped particles 4 mm long in particle size.

(5) Finally, the prepared rice granule product is dried by a hot air fluidized bed, wherein the drying temperature is 100° C., the drying time is 15 min, and the moisture content after drying is controlled to be 10%. After drying, the rice is cooled and packaged to obtain the low-glycemic index instant rice. And the instant rice can be eaten right after brewed for 10 min with boiling water.

The slowly digestible starch content is determined by the Englyst method, wherein the slowly digestible starch accounts for 50% or higher of the total starch content of the product, and after brewed for 10 minutes with boiling water, the residual amount of the slowly digestible starch reaches 70% or higher. The in vitro simulated postprandial glycemic index is determined by the Goni method, and the glycemic index of the product is 55 or lower.

Example 2

(1) Broken rice is humidified by a spraying process. The spray temperature is 30° C. After being sprayed, the raw material is taken out and spread, and surface moisture of the raw material is dried by cold air for later use. The dry-basis moisture content of the raw material after treatment is 30-40%.

(2) The broken rice is subjected to non-crystallization pretreatment by an instantaneous high-temperature fluidization technology, specifically, the broken rice after the humidification treatment is delivered into a high-temperature fluidizing machine, the fluidization temperature is 250° C., and the fluidization time is 50 s. After the treatment, the material is discharged from a discharge port, so that the gelatinization degree of the material reaches 85%.

(3) The treated broken rice is pulverized into 100 mesh rice flour, simultaneously protease is added, and the mixture is uniformly mixed. The enzyme preparation added in extrusion is alkaline protease, the total addition amount of the protease is 3% (w/w) of the rice flour raw material, the pH is adjusted to 9.5, and the moisture content is adjusted to 50%.

(4) After mixing, the mixture is fed into a twin-screw extruder, and the solid feed rate is 5 kg/h before the start of extrusion. The temperatures of four stages of the twin-screw extruder are set to 65° C., 75° C., 85° C. and 110° C. respectively, the screw speed is 110 rpm, the die pore diameter of the extruder discharge port is 8 mm, and the cutter speed at the discharge port is 250 rpm. Anhydrous acetic anhydride is added to the middle part of the second temperature change stage of a screw, and is added to the extruded material at a constant rate of 2 mL/min. Extrusion granulation is carried out by the twin-screw extruder, and cutting is carried out at the die to obtain granular or spherical or rod-shaped particles 6 mm long in particle size.

(5) The prepared rice granule product is dried by a hot air fluidized bed, wherein the drying temperature is 130° C., the drying time is 10 min, and the moisture content after drying is controlled to be 6%. After drying, the rice is cooled and packaged to obtain the low-glycemic index instant rice. And the instant rice can be eaten right after brewed for 5 min with boiling water.

The slowly digestible starch content is determined by the Englyst method, wherein the slowly digestible starch accounts for 70% or higher of the total starch content of the product, and after brewed for 5 minutes with boiling water, the residual amount of the slowly digestible starch reaches 90% or higher. The in vitro simulated postprandial glycemic index is determined by the Goni method, and the glycemic index of the product is 50 or lower.

Example 3

(1) Broken rice is humidified by a spraying process. The spray temperature is 28° C. After being sprayed, the raw material is taken out and spread, and surface moisture of the raw material is dried by cold air for later use. The dry-basis moisture content of the raw material after treatment is 30-40%.

(2) The broken rice is subjected to non-crystallization pretreatment by an instantaneous high-temperature fluidization technology, the broken rice after the humidification treatment is delivered into a high-temperature fluidizing machine, the fluidization temperature is 235° C., and the fluidization time is 40 s. After the treatment, the material is discharged from a discharge port, so that the gelatinization degree of the material reaches 70%.

(3) The treated broken rice is pulverized into 90 mesh rice flour, simultaneously protease is added, and the mixture is uniformly mixed. The enzyme preparation added in extrusion is alkaline protease, the total addition amount of the protease is 2% (w/w) of the rice flour raw material, the pH is adjusted to 9.0, and the moisture content is adjusted to 40%.

(4) After mixing, the mixture is fed into a twin-screw extruder, and the solid feed rate is 4 kg/h before the start of extrusion. The temperatures of four stages of the twin-screw extruder are set to 60° C., 70° C., 80° C. and 100° C. respectively, the screw speed is 90 rpm, the die pore diameter of the extruder discharge port is 6 mm, and the cutter speed at the discharge port is 230 rpm. Anhydrous acetic anhydride is added to the middle part of the second temperature change stage of the screw, and is added to the extruded material at a constant rate of 1 mL/min. Extrusion granulation is carried out by the twin-screw extruder, and cutting is carried out at the die to obtain granular or spherical or rod-shaped particles 5 mm long in particle size.

(5) Finally, the prepared rice granule product is dried by a hot air fluidized bed, wherein the drying temperature is 125° C., the drying time is 12 min, and the moisture content after drying is controlled to be 8%. After drying, the rice is cooled and packaged to obtain the low-glycemic index instant rice which can be eaten after brewed with boiling water for 8 min.

The slowly digestible starch content is determined by the Englyst method, wherein the slowly digestible starch accounts for 60% or higher of the total starch content of the product, and after the slowly digestible starch is brewed for 8 minutes with boiling water, the residual amount of the slowly digestible starch reaches 80% or higher. The in vitro simulated postprandial glycemic index is determined by the Goni method, and the glycemic index of the product is 53 or lower.

When the low-glycemic index starch-based reconstituted instant rice is prepared, the present disclosure combines solid-state non-crystallization treatment, esterification and enzyme extrusion technologies to improve the slowly digestible starch content and reduce the glycemic index of the product. If the present disclosure does not combine these technologies, the desired results cannot be achieved. For example, if one or more of solid-state non-crystallization treatment, esterification and enzymatic treatment are omitted, the product quality will be affected. Specifically, as shown in Table 1, Group B: when the solid-state non-crystallization treatment process is omitted, the broken rice obtained in step (1) is pulverized into 80-100 mesh rice flour to carry out step (3) and the subsequent treatment process.

Group C: when the esterification treatment is omitted, anhydrous acetic anhydride is not added in the extrusion process of step (4).

Group D: when the enzymatic treatment is omitted, in step (3), the broken rice treated in step (2) is pulverized into 80-100 mesh rice flour, and then directly fed into the twin-screw extruder without added enzyme, and step (4) and the subsequent treatment process are carried out.

Group E: when the solid-state non-crystallization treatment and esterification treatment are omitted, the broken rice obtained in step (1) is pulverized into 80-100 mesh rice flour to carry out step (3) and the subsequent treatment process, and anhydrous acetic anhydride is not added in the extrusion process of step (4).

Group F: when solid-state non-crystallization treatment and enzymatic treatment are omitted, the broken rice obtained in step (1) is pulverized into 80-100 mesh rice flour, and then directly fed into the twin-screw extruder without added enzyme to carry out step (4) and the subsequent treatment process.

TABLE 1

| | Technical operation conditions | | |
|---|---|---|---|
| Experimental group | Solid-state non-crystallization treatment | Esterification | Enzymatic hydrolysis |
| A | + | + | + |
| B | − | + | + |
| C | + | − | + |
| D | + | + | − |
| E | − | − | + |
| F | − | + | − |

Note: "+" means existence of the operation, and "−" means no such operation. The rest operation conditions are within the scope of the Examples of the present disclosure.

The obtained low-glycemic index instant rice is detected for the slowly digestible starch content and the glycemic index, and the detection results are shown in Table 2.

TABLE 2

| | Detection results of slowly digestible starch content and in vitro simulated glycemic index | |
|---|---|---|
| | Slowly digestible starch content (%) | In vitro simulated glycemic index |
| A | 75.1 ± 0.3 | 46.9 ± 0.2 |
| B | 68.4 ± 0.2 | 52.3 ± 0.1 |
| C | 41.7 ± 0.1 | 65.4 ± 0.5 |
| D | 43.8 ± 0.2 | 62.6 ± 0.1 |
| E | 36.5 ± 0.4 | 72.9 ± 0.3 |
| F | 39.2 ± 0.1 | 69.1 ± 0.2 |

As can be seen from the results, solid-state non-crystallization treatment, esterification and enzyme extrusion technologies will affect the slowly digestible starch content and the in vitro simulated glycemic index. Therefore, products with high content of slowly digestible starch and low in vitro simulated glycemic index need to be prepared by the present technology.

What is claimed is:

1. A method of preparing low-glycemic index slowly digestible starch-based reconstituted instant rice, comprising:
(i) humidifying broken rice with water sprayed at a temperature of 25° C. to 30° C.,
(ii) drying the broken rice,
(iii) subjecting the broken rice to a solid-state non-crystallization treatment, which comprises fluidizing the broken rice with a high-temperature fluidization machine, wherein the broken rice has a degree of gelatinization of 65% to 85% after fluidizing,
(iv) pulverizing the broken rice into 80 mesh to 100 mesh rice flour,
(v) hydrolyzing the 80 mesh to 100 mesh rice flour by addition of protease,
(vi) extrusion molding the hydrolyzed 80 mesh to 100 mesh rice flour, which comprises extruding by a twin-screw extruder at a solid feed rate of 2 kg/h to 5 kg/h before initiating extrusion,
wherein extruding is performed at four temperature stages comprising 55° C. to 65° C., 65° C. to 75° C., 75° C. to 85° C., and 85° C. to 110° C., wherein the twin-screw extruder is operated at a screw speed of 70 rpm to 110 rpm, wherein the twin-screw extruder comprises a die and a die pore comprising an extruder discharge port having a diameter of 4 mm to 8 mm, wherein the discharge port has a cutter speed of 200 rpm to 250 rpm, wherein anhydrous acetic anhydride is added at 3% to 6% (w/w) of the rice flour at temperature stage 65° C. to 75° C. and at a constant rate of 0.5 mL/min to 2 mL/min, and wherein material extruded from the die is cut to obtain granular or spherical or rod-shaped particles with a particle size of 4 mm to 6 mm, (vii) drying the particles by a hot air fluidized bed, and (viii) cooling the particles.

2. The method according to claim 1, wherein drying the broken rice comprises drying by cold air to a dry-basis moisture content of 30% to 40%.

3. The method according to claim 1, wherein the high-temperature fluidizing machine is operated at a fluidization temperature of 220° C. to 250° C., at a fluidization time of 30 seconds to 50 seconds.

4. The method according to claim 1, wherein the protease is alkaline protease.

5. The method according to claim 1, wherein 1% to 3% (w/w) of protease/rice flour is added, wherein moisture content is adjusted to 30% to 50% after the protease is added, at a pH value of 8.5 to 9.5.

6. The method according to claim 1, wherein drying the particles by a hot air fluidized bed is performed at a drying temperature of 100° C. to 130° C. for 10 minutes to 15 minutes, and wherein the moisture content after drying is controlled to be 6% to 10%.

7. A slowly digestible starch-based reconstituted instant rice prepared by a method comprising (i) humidifying broken rice with water sprayed at a temperature of 25° C. to 30° C., (ii) drying the broken rice, (iii) subjecting the broken rice to a solid-state non-crystallization treatment, which comprises fluidizing the broken rice with a high-temperature fluidization machine, wherein the broken rice has a degree of gelatinization of 65% to 85% after fluidizing, (iv) pulverizing the broken rice into 80 mesh to 100 mesh rice flour, (v) hydrolyzing the 80 mesh to 100 mesh rice flour by addition of protease, and (vi) extrusion molding the hydrolyzed 80 mesh to 100 mesh rice flour, which comprises extruding by a twin-screw extruder at a solid feed rate of 2 kg/h to 5 kg/h before initiating extrusion, wherein extruding is performed at four temperature stages comprising 55° C. to 65° C., 65° C. to 75° C., 75° C. to 85° C., and 85° C. to 110° C., wherein the twin-screw extruder is operated at a screw speed of 70 rpm to 110 rpm, wherein the twin-screw extruder comprises a die and a die pore comprising an extruder discharge port having a diameter of 4 mm to 8 mm, wherein the discharge port has a cutter speed of 200 rpm to 250 rpm, wherein anhydrous acetic anhydride is added at 3% to 6% (w/w) of the rice flour at temperature stage 65° C. to 75° C. and at a constant rate of 0.5 mL/min to 2 mL/min, and wherein material extruded from the die is cut to obtain granular or spherical or rod-shaped particles with a particle size of 4 mm to 6 mm, (vii) drying the particles by a hot air fluidized bed, and (viii) cooling the particles.

* * * * *